Nov. 13, 1956  R. M. DILWORTH ET AL  2,770,200
RAILWAY VEHICLE TRUCK
Filed Dec. 29, 1952  4 Sheets-Sheet 1
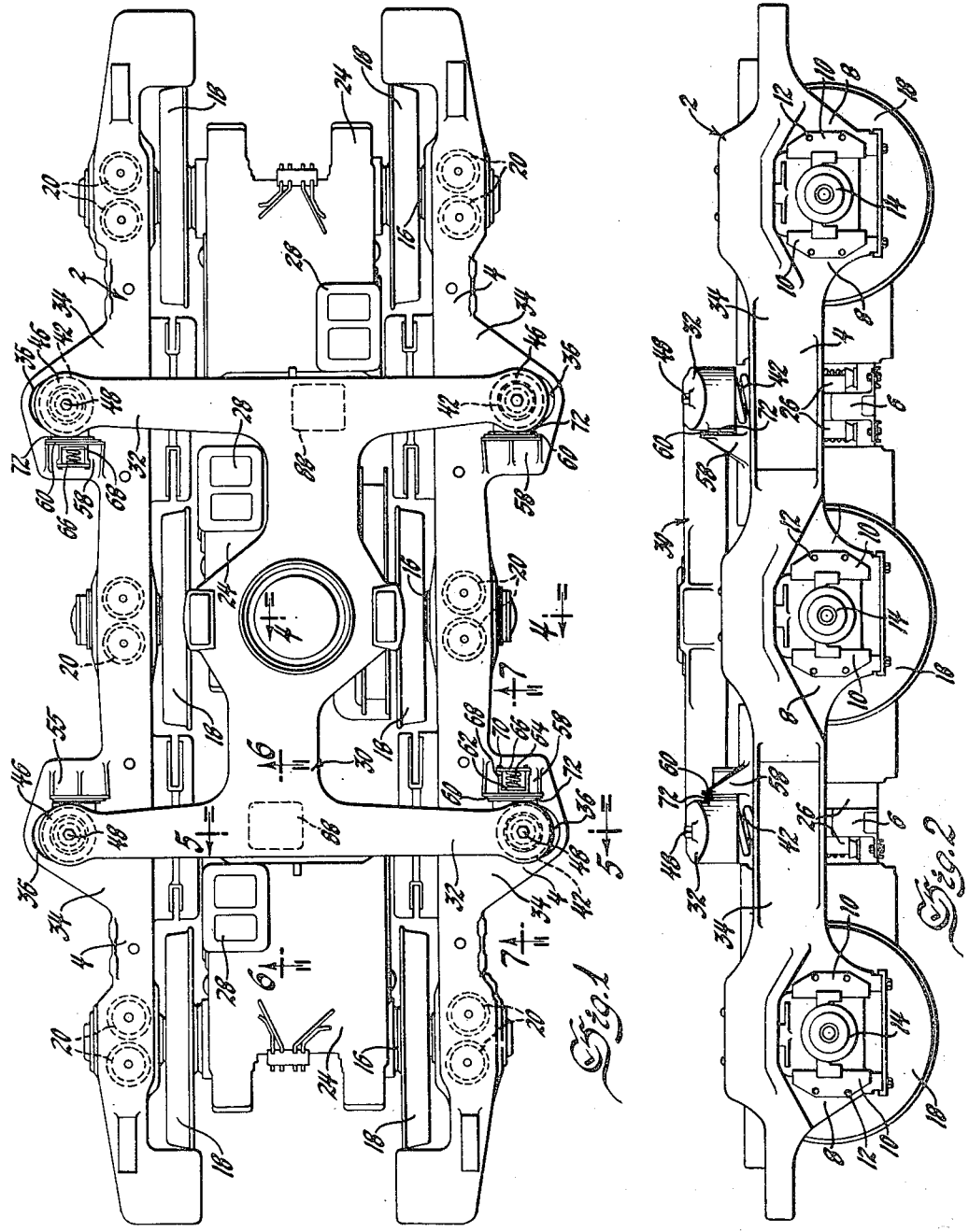
Inventors
Richard M. Dilworth &
Joseph P. Miller
By Willits, Helwig & Baillio
Attorneys Nov. 13, 1956  R. M. DILWORTH ET AL  2,770,200
RAILWAY VEHICLE TRUCK
Filed Dec. 29, 1952  4 Sheets-Sheet 2
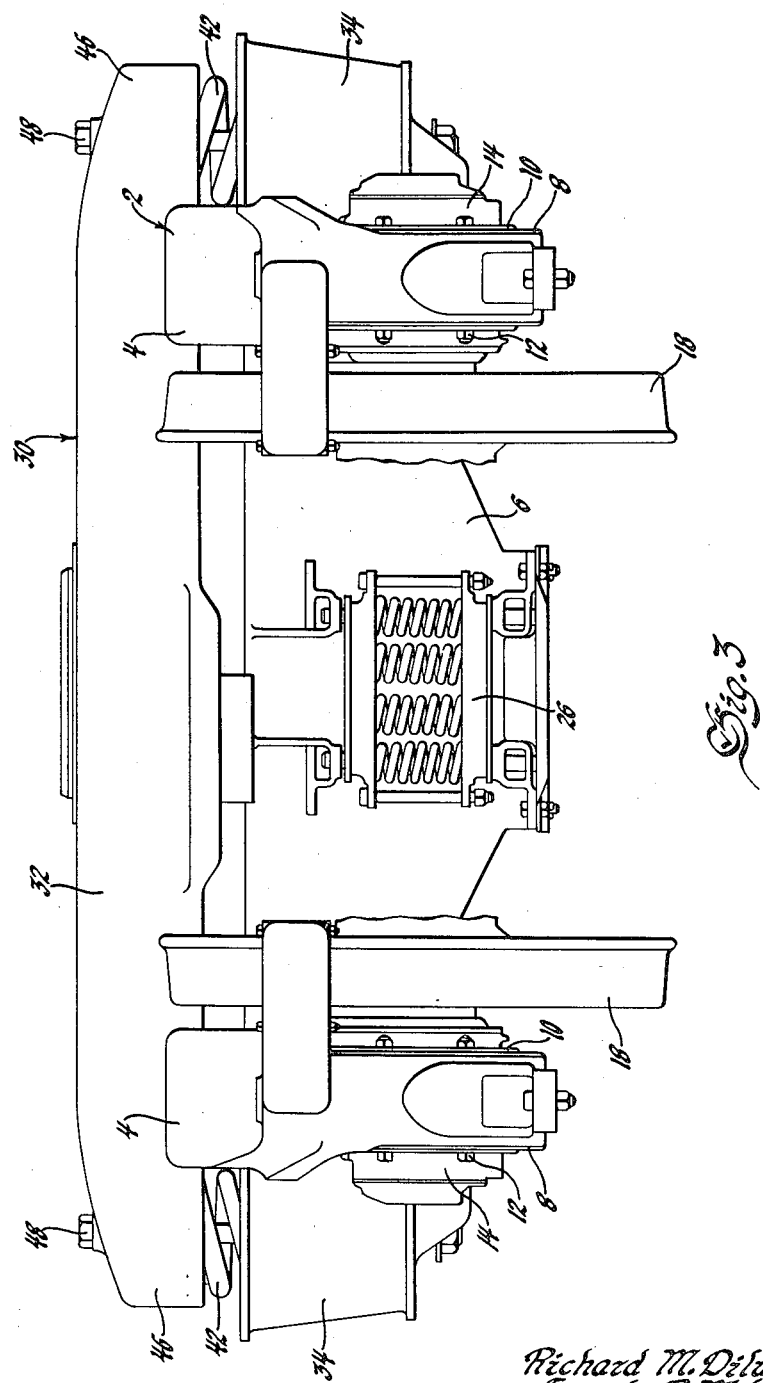
Inventors
Richard M. Dilworth &
Joseph P. Miller
By Willits, Helwig & Baillio
Attorneys Inventors
Richard M. Dilworth &
Joseph P. Miller
By Willis, Helwig & Baillio
Attorneys

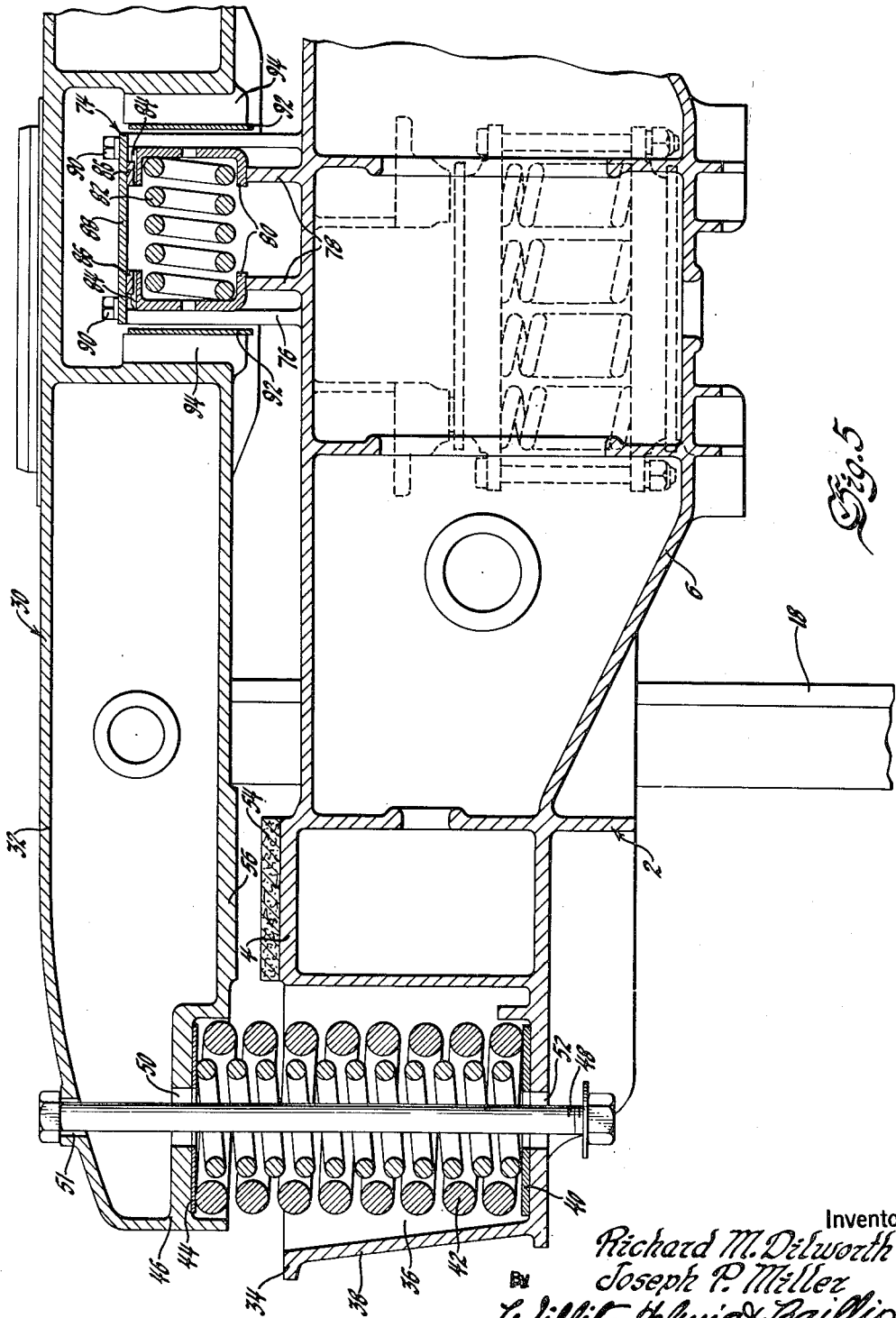

United States Patent Office 2,770,200
Patented Nov. 13, 1956

2,770,200

RAILWAY VEHICLE TRUCK

Richard M. Dilworth and Joseph P. Miller, Hinsdale, Ill., assignors to General Motors Corporation, Detroit, Mich., a corporation of Delaware Application December 29, 1952, Serial No. 328,378

8 Claims. (Cl. 105—192)

This invention relates generally to locomotive traction trucks and in particular to improvements in narrow gauge traction trucks to increase the stability of the truck and provide better riding qualities including improved snubbing of the truck elements with respect to each other.

One object of the invention is to provide in a narrow gauge locomotive traction truck sets of outwardly extending projections on the truck frame to increase the lateral span of the bolster supported on the frame of the truck thereby improving the stability of the bolster and the locomotive movably supported on the truck frame.

Another object of the invention is to provide in a locomotive traction truck having a wheeled frame and a bolster thereon spring supported outboard of the frame longitudinal members, longitudinally spaced transversely disposed helical coil spring shock absorbing means to provide gradually increased resistance to lateral movement of the bolster with respect to the truck frame.

A further object of this invention is to provide in a narrow gauge locomotive traction truck a novel arrangement of elements including spring means serving as the sole support of the bolster laterally outboard of the longitudinal members of the truck frame, diagonally spaced dead chafing means and diagonally live end facing snubber means, transversely disposed spring loaded shock absorbing means serving as lateral stops after permitting a predetermined lateral movement between the bolster and the frame, stop means adjacent each bolster supporting spring limiting downward movement toward said frame, and anti-separating means at each of said last mentioned stop means allowing for lateral movement of said bolster with respect to said truck frame within the limits of movement permitted the said transversely disposed shock absorbing means, the said elements cooperating to provide improved riding qualities of said traction truck during the diverse moments of locomotive operating conditions.

Another object of the invention is to provide a locomotive traction truck in which the several elements thereof cooperate, each in their specific function, in an improved manner to provide smoother riding qualities, positive absorption of operating shocks, and less relative angular movement between bolster and frame.

Other objects of the invention will become apparent by reference to the following detailed description taken in connection with the accompanying drawings, in which:

Figure 1 is a plan view of a narrow gauge six-wheel locomotive truck embodying the invention and showing the new lateral outwardly extending projections for supporting the bolster arms outside the vertical planes of the longitudinal frame members.

Figure 2 is a side view in elevation showing these projections resiliently supporting the bolster arm and upstanding longitudinal end facing abutments on these projections for transmitting longitudinal movement of the truck frame to the bolster.

Figure 3 is an end elevation showing the lateral outwardly extending projections outboard of the longitudinally extending side frame members of the truck, the projections containing helical springs for supporting the ends of the bolster.

Figure 5 is an enlarged section taken on line 5—5 of Figure 1 and shows the lateral resilient stop means provided on the transom members of the frame and also the spring cup formed in the laterally extending projections for containing coil springs and anti-separating means to resiliently secure and support the bolster extremities outboard of the longitudinal side members of the truck frame.

Figure 4:
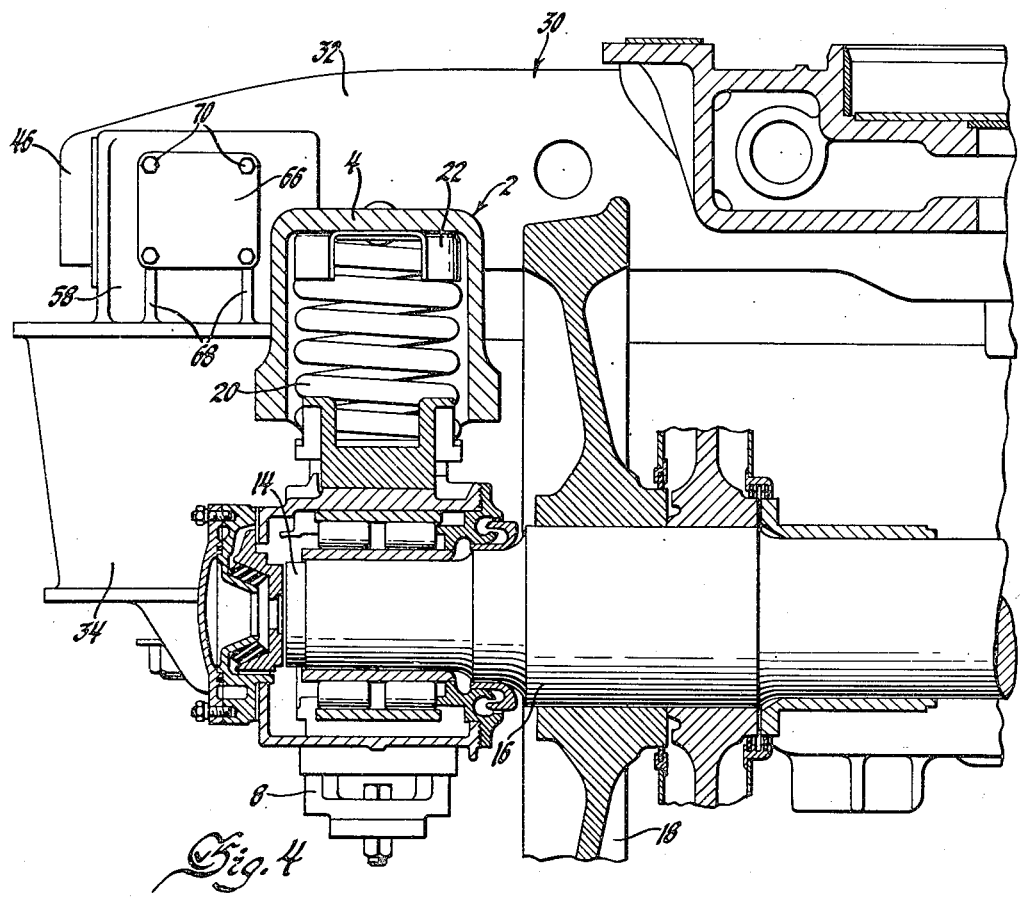
Figure 4 is an enlarged sectional view taken on the line 4—4 of Figure 1 and shows the manner in which the longitudinal side frame members are resiliently supported on the axle journal boxes.

Referring now to the accompanying figures, a locomotive traction truck is shown having an integrally formed frame indicated generally by the numeral 2. This frame is composed of longitudinally extending side frame members 4 and longitudinally spaced transverse transom members 6. Each longitudinal side frame member 4 is provided with pairs of downwardly extending pedestals 8 having the usual pedestal liners 10 fastened thereto by the bolt assemblies 12. Retained for vertical sliding movement between the pairs of oppositely disposed pedestals and liners are journal box assemblies 14 to which are rotatably attached the usual axles 16 and wheels 18. As best seen in Figures 1 and 4, the side frame members 4 are resiliently supported on the upper side of the journal box assemblies 14 by means of helical coil springs 20 seated thereon and extending upwardly inside the longitudinal side frame members 4 to engage the upper spring shims 22. Supported on the axles 16 are the ends of three traction motors 24. The opposite ends of these motors are resiliently supported on the transom frame members 6 by means of the resilient traction motor mounts indicated generally by the numeral 26. Each of the traction motors 24 is provided with a cooling duct 28 to which cooling air may be supplied to cool the interior of these motors.

Referring now to Figures 1, 2, 3 and 5 an H-shaped bolster indicated generally by the numeral 30 is shown having longitudinally spaced laterally extending arms 32 whose extremities 46 extend laterally beyond the longitudinally extending side frame members 4. In order to increase the lateral span of these bolster arms lateral outwardly extending projections 34, having spring pockets 36 formed therein, have been provided on the longitudinal side frame members 4. These pockets 36 are formed with upward and outwardly diverging walls 38. Seated within these pockets 36 on lower spring shims 40 are helical coil bolster spring assemblies 42. Supported on the upper ends of the coil spring assemblies 42 and an upper spring shim 44 are the extremities 46 of the bolster arms 32. The bolster is prevented from separating from the truck frame 2 after a predetermined movement relative to the frame by means of anti-separating means comprising bolt assemblies 48 extending downwardly through the extremities 46, the helical coil spring assemblies 42, and the underside of the laterally outwardly extending projections 34. Laterally extending slots 50, 51 and 52 are provided in the bolster extremities 46 and the underside of the projections 34 to allow a certain amount of movement to the bolt assemblies 48 relative to the bolster 30 and to the frame 2. Vertical limit stops 54 and 56 are provided on the truck frame and bolster respectively immediately adjacent the bolster spring assemblies 42 to limit downward vertical movement of the bolster with respect to the truck frame.

Figure 7:
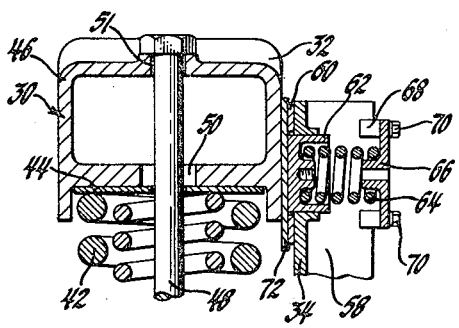
Figure 7 is a section taken on line 7—7 of Figure 1 through the lateral resilient stop means provided on the transom members of the frame.

Figures 1, 2 and 7 illustrate the manner in which longitudinal movement is transmitted between the truck frame 2 and the bolster 30. These figures show four longitudinal end facing upstanding abutments 58 provided on the laterally extending projections 34. Each of these abutments is provided with a chafing plate 60. However, in the case of two of these abutments and their respective chafing plates a friction damping means is employed comprising a plunger 62 resiliently loaded by a small helical coil spring 64 which is retained in the abutment 58 by means of a cover plate 66 fastened to a pair of oppositely disposed walls 68 by the bolts 70. Each of the extremities 46 of the bolster arms 32 are also provided with chafing plates 72 which may engage the chafing plates 60 on the projections 34 as well as the plunger 62 of the friction damping means to thereby transmit longitudinal motion between the bolster and the frame. It may be appreciated that by having the friction loaded plungers 62 engage two diagonally disposed chafing plates 60, longitudinal take-up between the bolster and the frame will be more gradual and also any lateral and vertical movement between bolster and frame, created by compression and extension of the bolster spring assemblies 42 will be damped. Also, by providing these diagonally spaced friction means on the laterally extending projections 34 rather than the longitudinally extending frame members 4 any tendency on the part of the bolster to yaw with respect to the truck frame will be materially reduced thereby tending to stabilize the bolster 30 on the truck frame 2.

Figure 6:
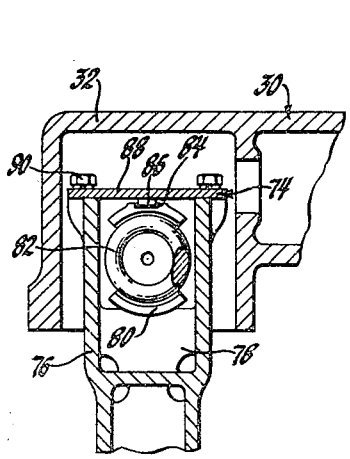
Figure 6 is an enlarged section in elevation taken on line 6—6 of Figure 1 through one of the diagonally disposed set of end facing friction damping means located on their respective laterally extending projections.

Figures 5 and 6 illustrate one of the new improved and simplified spring loaded lateral stop means provided on each transom member 6, these new stop assemblies being indicated generally by the number 74. Each of these new lateral stop assemblies 74 comprises a pair of oppositely disposed vertical projections 76, each being located slightly off center on a transom member 6. Located between the projections 76 are a pair of ribs 78 integrally formed on the transom member 6 which movably support a pair of plungers 80 resiliently maintained apart and in abutting relation with the projections 76 by means of a small helical spring 82. To prevent the plungers 80 from rotating relative to the ribs 78, slotted key-ways 84 are suitably fastened to the upper portion of the plungers 80. These key-ways 84 are adapted to slidably engage a pair of keys 86 suitably fastened to a cover plate 88 which is secured to the upstanding projection 76 by means of bolt assemblies 90. Each bolster arm of the bolster 30 is provided with oppositely disposed inwardly facing wear or chafing plates 92 attached to lateral inwardly facing abutments 94 located on opposite sides of the resilient lateral stop assemblies 74. The wear plates 92 and the abutments 94 are adapted to alternately enter between the upstanding projections 76 upon extended lateral movement of the bolster 30 where they alternately engage the plungers 80 to thereby rapidly increase the resistance to extended lateral movement of the bolster 30 with respect to the frame 2.

It will now be appreciated that a new truck has been described for narrow gauge type railroads which includes uniquely located elements in combination to give a truck having superior riding qualities formerly obtainable only in trucks of wider gauge. The lateral outwardly extending projections 34 increase the stability between the bolster and the frame and also provide a convenient and unique location for means including friction means to transmit longitudinal movement between the bolster and the frame. The friction means acting at the extreme ends of the bolster arms allow gradual take-up of clearance between bolster and frame and also eliminate or materially reduce the amount of yaw between bolster and frame usually occurring in other narrow gauge trucks.

We claim:
1. A railway vehicle truck comprising a frame having supporting wheels and axles rotatably attached thereto and composed of longitudinally extending side frame members retained in parallel relationship by transversely extending longitudinally spaced transom members, a bolster having longitudinally spaced laterally extending arms, lateral outwardly extending means on said longitudinally extending members, and cushioning means resiliently supporting said bolster arms outside the vertical planes of said longitudinal members on said outwardly extending means, and means on said lateral outwardly extending means engageable with said laterally extending arms outside the vertical planes of said longitudinal members to transmit stabilized longitudinal movement of said frame to said bolster.

2. A railway vehicle truck comprising a frame supported by rotatable wheels and axles attached thereto and composed of two longitudinally extending side frame members maintained in parallel relationship with respect to each other by longitudinally spaced transversely extending transom members forming junctures therewith, said transom members being oppositely disposed equal distances from the transverse center line of said truck, an H-shaped bolster having longitudinally spaced transversely extending arms in the vertical planes through said transverse members, said bolster arms having extremities extending outwardly beyond the vertical planes through said longitudinal side frame members, lateral outwardly extending projections formed on said longitudinal side frame members adjacent the junctures formed by said longitudinal and transverse members, and cushioning means resiliently supporting on said projections the extremities of said bolster arms outside the vertical planes through said longitudinal members to stabilize lateral and vertical motion of said bolster with respect to said frame, said projections being provided with longitudinal end facing upstanding abutments adapted to engage longitudinal center facing abutments on said extremities to transmit longitudinal movement between said frame and said bolster.

3. A locomotive truck comprising a truck frame having rotatable wheels and axles attached thereto, said frame including longitudinal side frame members and transverse members, lateral outwardly extending projections on said side frame members, said projections having spring pockets formed therein, springs seated in said pockets, a bolster having arms extending laterally outwardly beyond said side frame members and over said projections and said springs to be resiliently supported on said springs outside said longitudinal members to stabilize lateral and vertical motion of said bolster with respect to said frame, said projections being provided with upstanding longitudinal end facing surfaces, said bolster arms having upstanding longitudinal center facing surfaces engageable with said first-mentioned surfaces outwardly beyond said side frame members, and upstanding resilient stops on said transom members having oppositely disposed outwardly facing surfaces adapted to alternately engage oppositely disposed inwardly facing surfaces on said bolster arms to increasingly resist extended lateral movement of said bolster with respect to said frame.

4. A railway vehicle truck comprising longitudinal side frame members supported by rotatable axles and wheels attached thereto, longitudinally spaced transom members extending between said longitudinal members for maintaining parallel spaced relationship between said longitudinal members, outward laterally extending projections on said longitudinal side frame members, a bolster having laterally extending arms with extremities, cushioning means resiliently supporting said extremities on said projections outside the planes of said longitudinal members, longitudinally end facing chafing plates on said extremities, and upstanding means provided on said projections adapted to engage the chafing plates on the extremities of said bolster arms to transmit longitudinal movement between said bolster and said frame.

5. A railway vehicle truck for narrow gauge railroads having supporting wheels and axles rotatably attached thereto comprising an integral frame composed of a pair of longitudinally extending side frame members and a pair of longitudinally spaced transverse transom members, longitudinally spaced outwardly extending projections on said longitudinal side frame members adjacent junctures formed by said longitudinal side frame members and said transom members, an H-shaped bolster having longitudinal spaced laterally extending arms whose extremities extend over said projections, helical coil springs seated on said projections and resiliently supporting the extremities of said bolster arms, a pair of longitudinal end facing chafing plates on two of said projections and diagonally disposed with respect to the lateral and longitudinal center lines of said truck, said chafing plates having longitudinal end facing spring loaded friction damping means extending through said chafing plates, longitudinal center facing chafing plates on said bolster extremities and diagonally located with respect to the longitudinal and lateral center lines of said truck and adapted to engage said longitudinal end facing friction means and said longitudinal end facing chafing plates, a second pair of longitudinal end facing chafing plates on the other of said projections adapted to engage a second set of longitudinal center facing chafing plates on the extremities of said bolster arms, said chafing plates and friction means cooperating to transmit longitudinal movement of said frame to said bolster, and a pair of resilient stops on said transom members and having lateral outwardly facing helical coil spring loaded surfaces adapted to alternately engage lateral inwardly facing stops on said bolster to increasingly oppose extended lateral movement between said bolster and said frame.

6. A railway vehicle truck for narrow gauge railroads having supporting wheels and axles rotatably attached thereto comprising an integral frame composed of a pair of longitudinally extending side frame members and a pair of longitudinally spaced transverse transom members, longitudinally spaced outwardly extending projections on said longitudinal side frame members adjacent junctures formed by said longitudinal side frame members and said transom members, an H-shaped bolster having longitudinally spaced laterally extending arms whose extremities extend over said projections, helical coil springs seated on said projections and resiliently supporting the extremities of said bolster arms, a pair of longitudinal end facing chafing plates on two of said projections and diagonally disposed with respect to the lateral and longitudinal center lines of said truck, said chafing plates having longitudinal end facing spring loaded friction damping means extending through said chafing plates, longitudinal center facing chafing plates on said bolster extremities and diagonally located with respect to the longitudinal and lateral center lines of said truck and adapted to engage said longitudinal end facing friction means and said longitudinal end facing chafing plates, a second pair of longitudinal end facing chafing plates on the other of said projections adapted to engage a second set of longitudinal center facing chafing plates on the extremities of said bolster arms, said chafing plates and friction means cooperating to transmit longitudinal movement of said frame to said bolster, and a pair of resilient stops located off the longitudinal centerline of said truck and on said transom members, said stops including a pair of oppositely disposed cup shaped members having lateral outwardly facing surfaces, said cup shaped members being supported on said transom members for lateral movement relative thereto, a helical coil spring interposed between said cup shaped members resiliently maintaining said cup shaped members apart and said surfaces in normal abutting relation with a pair of upstanding apertured abutments on said transom members, key means on said abutments and said cup shaped members to prevent rotation of said cup shaped members relative to said abutments, and opposed lateral inwardly facing abutting chafing plates on said bolster adapted to alternately enter apertures in said abutments to alternately engage said lateral outwardly facing surfaces to increasingly oppose extended lateral movement between said bolster and said frame.

7. A locomotive truck comprising a truck frame having supporting rotatable wheels and axles attached thereto, said frame including a pair of longitudinally extending side frame members outwardly of said wheels, a bolster, lateral outwardly extending supporting means rigidly fixed on said members, said supporting means having resilient means supported directly thereon which support said bolster on said frame outwardly of said side frame members to stabilize said bolster with respect to said frame, and means on said outwardly extending means engaging said bolster outwardly of said side frame members to transmit longitudinal movement of said frame to said bolster.

8. A railway vehicle truck supportable by rotatable axles and wheels comprising a truck frame having longitudinal members outward of said wheels and longitudinally spaced lateral transom members extending therebetween, a bolster, lateral outwardly extending supporting means rigidly fixed on said longitudinal members, said supporting means having resilient means supported directly thereon which support said bolster outside the vertical planes of said longitudinal members, longitudinally facing chafing plates on said laterally outwardly extending means engageable with said bolster outside the vertical planes of said longitudinal members to transmit longitudinal movement between said bolster and said frame, the location of said means relative to said longitudinal members acting to stabilize movement between said bolster and frame.

References Cited in the file of this patent

UNITED STATES PATENTS

| 887,195 | Hopkins | May 12, 1908 |
| 2,173,725 | Pflager | Sept. 19, 1939 |
| 2,190,728 | Mohun | Feb. 20, 1940 |
| 2,368,784 | Schrage | Feb. 6, 1945 |
| 2,492,337 | Travilla | Dec. 27, 1949 |
| 2,509,694 | Nystrom | May 30, 1950 |
| 2,551,064 | Spenner | May 1, 1951 |